United States Patent
Eidus et al.

(10) Patent No.: US 9,176,763 B2
(45) Date of Patent: Nov. 3, 2015

(54) APPARATUS AND METHOD THEREOF FOR EFFICIENT EXECUTION OF A GUEST IN A VIRTUALIZED ENVIRONMENT

(71) Applicant: Ravello Systems Ltd., Ra'anana (IL)

(72) Inventors: Izik Eidus, Kfar Saba (IL); Leonid Shatz, Ra'anana (IL); Michael Rapoport, Haifa (IL); Alexander Fishman, Netanya (IL)

(73) Assignee: Ravello Systems Ltd., Ra'anana (IL)

( * ) Notice: Subject to any disclaimer, the term of this patent is extended or adjusted under 35 U.S.C. 154(b) by 68 days.

(21) Appl. No.: 13/685,099

(22) Filed: Nov. 26, 2012

(65) Prior Publication Data

US 2013/0139159 A1 May 30, 2013

Related U.S. Application Data

(60) Provisional application No. 61/563,859, filed on Nov. 28, 2011.

(51) Int. Cl.
*G06F 9/455* (2006.01)

(52) U.S. Cl.
CPC .. *G06F 9/45545* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,865,688 B2 | 3/2005 | Dawkins et al. | |
| 7,200,704 B2 | 4/2007 | Njoku et al. | |
| 7,475,183 B2 | 1/2009 | Traut et al. | |
| 7,606,965 B2 | 10/2009 | Njoku et al. | |
| 7,634,650 B1 | 12/2009 | Shah et al. | |
| 7,657,694 B2 | 2/2010 | Mansell et al. | |
| 7,757,231 B2 | 7/2010 | Anderson et al. | |
| 7,865,766 B2 | 1/2011 | Duron et al. | |
| 7,954,099 B2 | 5/2011 | Easton et al. | |
| 7,958,293 B2 | 6/2011 | Bakke et al. | |
| 7,979,869 B2 | 7/2011 | Manczak et al. | |
| 8,001,544 B2 | 8/2011 | Brice, Jr. et al. | |
| 2007/0028244 A1* | 2/2007 | Landis et al. | 718/108 |
| 2008/0177994 A1 | 7/2008 | Mayer | |
| 2008/0288940 A1 | 11/2008 | Adams et al. | |
| 2009/0113110 A1 | 4/2009 | Chen et al. | |
| 2009/0113111 A1 | 4/2009 | Chen et al. | |
| 2009/0113424 A1 | 4/2009 | Chen et al. | |
| 2009/0113425 A1 | 4/2009 | Ports et al. | |
| 2009/0249053 A1* | 10/2009 | Zimmer et al. | 713/2 |

(Continued)

OTHER PUBLICATIONS

Champagne et al. Scalable Architectural Support for Trusted Software. [online] (Jan. 14, 2010). IEEE., pp. 1-12. Retrieved From the Internet <http://palms.ee.princeton.edu/system/files/Champagne_HPCA1O_Camera_Ready.pdf>.*

(Continued)

*Primary Examiner* — Emerson Puente
*Assistant Examiner* — Jonathan R Labud
(74) *Attorney, Agent, or Firm* — M&B IP Analysts, LLC

(57) ABSTRACT

A method for efficient execution of a guest in a virtualized computing environment is provided. The method comprises causing an execution of at least one virtual machine on a computing hardware, the virtual machine executes a hypervisor in a first security ring; and causing an execution of a single guest program on one of the at least one virtual machines, the single guest program comprises a kernel being executed in the first security ring and at least one application being executed in a second security ring.

14 Claims, 3 Drawing Sheets

(56) References Cited

U.S. PATENT DOCUMENTS

| | | |
|---|---|---|
| 2010/0125708 A1 | 5/2010 | Hall et al. |
| 2010/0281273 A1 | 11/2010 | Lee et al. |
| 2011/0047544 A1 | 2/2011 | Yehuda et al. |
| 2011/0072428 A1 | 3/2011 | Day, II et al. |
| 2011/0107008 A1 | 5/2011 | Ben-Yehuda et al. |
| 2011/0153909 A1 | 6/2011 | Dong |
| 2012/0054409 A1 | 3/2012 | Block et al. |
| 2012/0198431 A1 | 8/2012 | Lin |

OTHER PUBLICATIONS

Adams, K. et al., "A Comparison of Software and Hardware Techniques for x86 Virtualization"; ASPLOS'06, Oct. 21-25, 2006; San Jose, CA, USA.

* cited by examiner

APPARATUS AND METHOD THEREOF FOR EFFICIENT EXECUTION OF A GUEST IN A VIRTUALIZED ENVIRONMENT

CROSS REFERENCE TO RELATED APPLICATIONS

This patent application claims priority from U.S. provisional patent application No. 61/563,859, filed on Nov. 28, 2011, which is hereby incorporated by reference for all that it contains.

TECHNICAL FIELD

The present invention generally relates to virtual machines (VMs), and more specifically to the efficient execution of an application being executed as a guest on a VM.

BACKGROUND

Hardware virtualization is the process of creating of a virtual machine that acts like a computer with an operating system. Software executed on these virtual machines is typically separated from the underlying hardware resources. A hypervisor is a program that allows guest virtual machines to run concurrently on a host computer. The hypervisor presents to the guests a virtual operating platform and manages the execution of the guest operating systems. Thus, multiple instances of a variety of operating systems may share the virtualized hardware resources.

In the prior art there are described virtualization architectures having a hypervisor that are further extended to expose the hardware of the system to upper layers. Such extensions involve the use of, for example, nested virtualization where above a virtual platform an additional level of virtualization takes place. A typical nested virtualization environment includes three layers of virtualization over the hardware infrastructure: a host hypervisor, guest hypervisors, and VMs. Each of the guest hypervisors controls the execution of the plurality of VMs. In this architecture, each VM can execute one or more guest operating system (although VMs can execute also without having any guests too). The problem in such virtualization architecture is that this approach is very slow as many software components are involved in the execution of a guest OS or any application executed by the VM.

As the guest OS runs in a limited memory address space, there is not enough space to access the full hardware, thus hardware emulation is required resulting in a significantly slower execution. For example, in the event the hypervisor needs to respond to a system call by a guest requires moving from one address space to another, traps are utilized for the purpose which results in duplication of execution environments. This happens because the move from one address space to another also involves a multitude of traps that require additional processing and hinder performance. Moreover, as hardware emulation in software is required, the overall performance is further reduced.

Typically, a trap initiates a full operation that relinquishes control from the guest OS and transfers the control to the hypervisor. This involves, for example, switching from execution in Ring 0 to execution in Ring 3, which entails significant overhead. The execution takes place at the hypervisor level and then needs to relinquish control to the guest, which again involves an overhead to reach back for Ring 0 execution. Rings or protection rings are hierarchical protection domains utilized to protect data and functionality from faults and malicious actions. Each protection provides different levels of access to hardware/software resources. In a typical operating system, the most privileged is the kernel or Ring 0 which interacts directly with the physical hardware (e.g., the CPU and memory), while the least privileged is Ring 3.

To further appreciate the complexity of handling the move from one level to another, one may also consider the case of a page fault at the guest. A page fault typically results in an exception to the firmware of the guest and from there an exception to the kernel moving to a different ring. Each such operation is very costly in terms of performance. One of the problems in handling page faults this way is the fact that there is no data of the guest OS in kernel (Ring j), a potentially risky proposition that is solved at times by using segmentation limits. That way the user cannot see the data that is in the kernel.

However, such support is not generally or otherwise efficiently available in modern 64-bit processors, and hence workarounds are needed. To this end, a limited number of instructions are available (typically for an X86® architecture being some thirteen instructions), however, the need for the monitoring of the workarounds when they occur results in significant overhead.

Typical prior art solutions first check for all places in the code where it will be necessary to move between the guest and the hypervisor; such code is typically replaced by using a jump command. This is necessary because prior art solutions specifically deter from the execution of the kernel of the guest in the same security ring of that of an application executed by the guest. Therefore, prior art solutions typically execute at the kernel and the application of the guest at the same security ring, for example, Ring 3, while the hypervisor is being executed, for example, in Ring 0. An exemplary case for a long jump from the hypervisor and the kernel as well as application of the guest is shown in FIG. 1.

It would be therefore advantageous to provide a solution that overcomes the deficiencies of the prior art. It would be further advantageous if such a solution maintains the security requirements of the various rings of the operating system.

SUMMARY

Certain embodiments disclosed herein include an apparatus for efficient execution of a guest in a virtualized environment. The apparatus comprises a processor; and a memory coupled to the processor configured to store at least a first set of instructions for execution of at least one virtual machine by the processor, wherein each of the at least one virtual machines executes a single hypervisor that is being executed in a first security ring, the memory further stores a second set of instructions for execution of a single guest program by the processor over the at least one virtual machine, the guest program comprises a kernel and at least one application executed therein, wherein the virtual machine (VM) kernel executed in the first security ring and the at least one application is executed in a second security ring.

Certain embodiments disclosed herein further include a method for efficient execution of a guest in a virtualized computing environment. The method comprises causing an execution of at least one virtual machine on a computing hardware, the virtual machine executes a hypervisor in a first security ring; and causing an execution of a single guest program on one of the at least one virtual machines, the single guest program comprises a kernel being executed in the first security ring and at least one application being executed in a second security ring.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
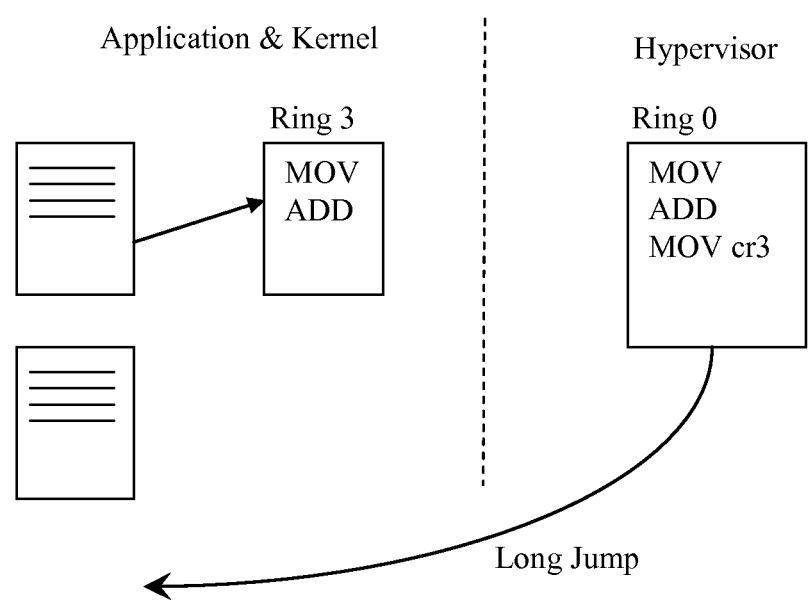
FIG. 1 is a schematic diagram of code execution using different protection rings for the guest's kernel and the hypervisor, requiring the use of a long jump upon a trap.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to various embodiments disclosed herein, a virtualized environment that includes a plurality of virtual machines (VMs) each of which executes a hypervisor being executed over a hardware infrastructure is provided. The hypervisor runs in a first security ring with a single guest being executed on each VM. The guest further comprises at least a software application being executed in a second security ring.

The disclosed virtualized environment does not need to trap upon execution of certain instructions and move to the hypervisor with all the overhead that this requires, as it is assumed that the integrity and security is always maintained by the hypervisor of the respective VM. According to various embodiments disclosed herein, instead of moving between address spaces when the guest runs in a limited memory address space, the execution of the guest is performed within the same address space, e.g., in the guest space address. As a result no traps are necessary, and hence, operations that would result with a trap can be performed within the guest rather than in the hypervisor. This prevents the need of context switching in order to hop between the guest and hypervisor with all the overhead that this entails.

Moreover, according to one embodiment, in the disclosed virtualized environment a hypervisor runs only a single guest. The advantage for a hypervisor to run a single guest is that it is not necessary to run protection mechanisms when moving from the hypervisor to the guest and vice versa. This is due to the fact that the hypervisor handles all the protection needs for the guest, thus there is no need to run additional protections at the guest level. Therefore, it is possible to avoid such protection checks at the guest level. This approach allows running the kernel of the guest in the same ring of that of the hypervisor.

Figure 2:
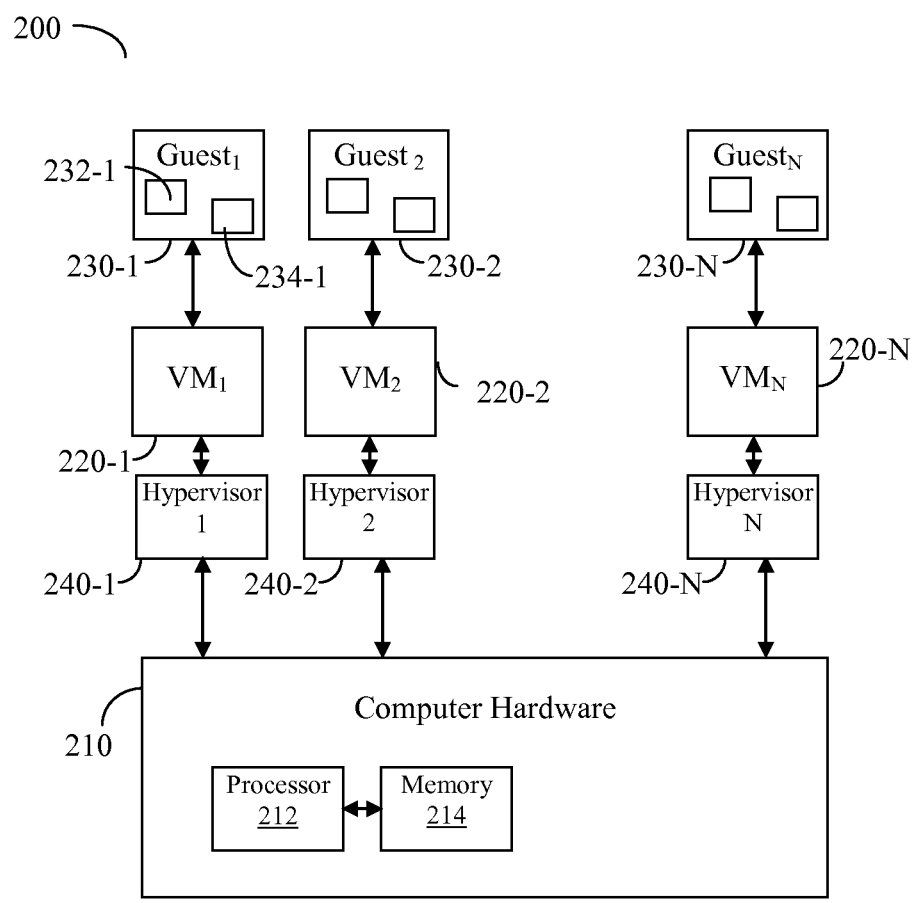
FIG. 2 is a schematic diagram of a system according to an embodiment of the invention.

FIG. 2 depicts an exemplary and non-limiting schematic diagram of a system 200 implementing a virtualized environment according to one embodiment. The system 200 comprises a computer hardware 210 which typically includes at least a processor coupled to a memory. The computer hardware 210 includes a processor 212 and a memory unit 214 coupled to the processor 212. The processor 212 may be a central processing unit (CPU) having one or more cores. The computer hardware 210 typically also includes other computing resources, such as a storage disk, a motherboard, a memory management unit, registers, I/O ports, a network interface card (NIC), a display adapter, and the like.

The computer hardware 210 executes one or more virtual machines (VM) 220, for example VMs 220-1, 220-2, ..., 220-N. Each VM 220 executes a hypervisor 240 in a first security ring, for example, security Ring 0. According to a preferred embodiment, each VM 220 also executes a single guest 230. For example, a VM 220-1 executes a guest 230-1, a VM 220-2 executes a guest 230-2, and so on. Each guest operating system 230-$i$ (i=1, 2, ..., N), comprises a single kernel 232-$i$ and at least one guest application 234-$i$. However, it should be noted that a plurality of applications may be executed by a guest 230-$i$.

According to one embodiment, the execution of the kernel 232-$i$ (i=1, 2, ..., N) is in the security Ring 0, the same as that of the respective hypervisor 240-$i$. Therefore, the responsibility for the integrity and security of execution of a guest 230-$i$ of a VM 220-$i$ is performed solely by the hypervisor of the respective VM 220-$i$. Thus, the hypervisor of the VM 220-$i$ is not required to duplicate the work on the kernel 232-$i$. Moreover, as a result of this architecture, it is not necessary to perform the traps and/or the long jumps.

It should be noted that running a kernel 232-$i$ of a guest operating system 230-$i$ and the hypervisor of the respective VM 220-$i$ in the same security ring requires, for example, changing the stacks within the same ring. This is required because moving between rings would typically be automatically handled by the processor. However, the execution of the kernel 232-$i$ and the VM firmware in the same ring provides performance advantages that significantly outweigh the impact of the additional functions that need to take place as a result of executing the kernel and the hypervisor in the same ring. The fact that moving from the VM firmware to the kernel and back involves a simple jump command ensures this performance advantage.

In yet another embodiment, due to the particular nature of a single guest with respect of the hypervisor, it is possible to allow a guest operating system 230-$i$ to change hypervisor data. This eliminates the lengthy and costly process of going back to the hypervisor and then back to the guest by means of the long jumps, thus the data can be directly checked without harming the integrity of the system. In one embodiment, the exceptions are received from a given ring where the guest is executed and remain therein. Therefore, all the overhead associated with the movement between rings is avoided, thereby improving the performance of the executed software.

The execution of the guest, according to one embodiment, requires checking each and every instruction to determine at least if a change to the executed code is required. When access is made that requires a change to the code executed, a regular move operation is used rather than a long move, i.e., a move that goes out of the address space of the guest operating system.

Moreover, the execution of the instruction continues within the same ring in which the guest is currently executed. Hence, the transfer into the VM kernel space of the guest operating system is significantly improved.

In another embodiment, when the jump is performed, the hypervisor 240-$i$ checks the code and makes the necessary operations and then returns to the regular operation without moving between rings and without degrading the overall protection or integrity of the system. The hypervisor 240-$i$ uses a hash table to determine the return address to ensure proper execution.

It should be noted that in the case of a move instruction in the code it is necessary to perform the process described hereinabove. However, as the jump may occur multiple times the overhead of going each time through the process, while not prohibitive, is undesirable. Therefore, according to an embodiment of the invention, the jump instruction is identified on a subsequent case and not directed immediately to the place determined previously to be the jump address for the jump instructions, using information stored in the cache. The cache may be part of a memory unit 214. This prevents the need to have the hypervisor intervention thereby saving further overhead, as execution fairly quickly becomes close to native execution, once all jump instructions are cashed.

Figure 3:
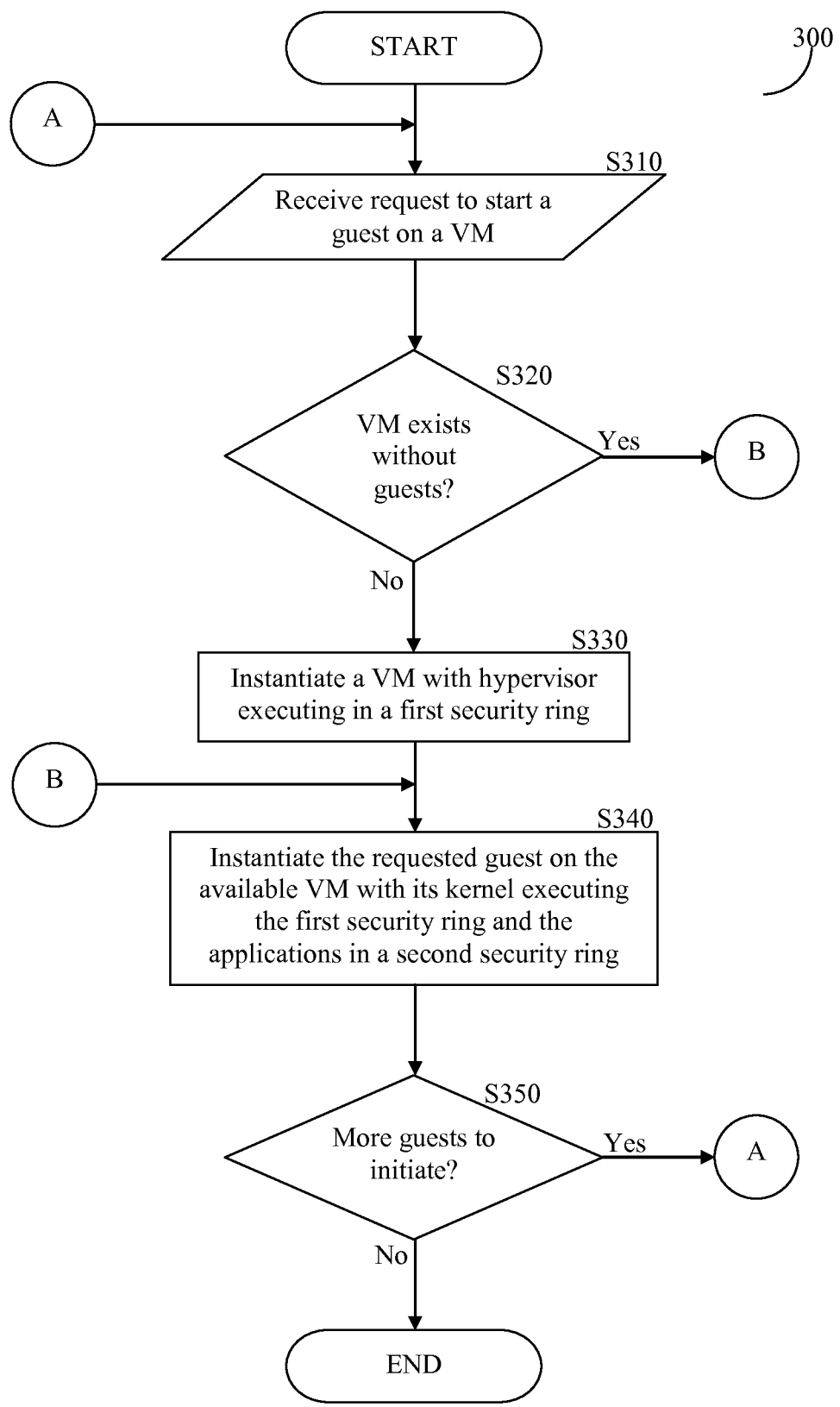
FIG. 3 is a flowchart of the configuration of a guest on a system according to the principles of the invention.

FIG. 3 is an exemplary and non-limiting flowchart 300 illustrating the configuration of a guest on a system according to one embodiment. In S310, a request is received to start a guest OS on a system, for example, system 200. In S320, it is checked whether there is a VM 220 being executed on the system 200 that does not currently have any other guest executed thereon, and if so execution continues with S340. Otherwise, in S330, a new VM 220 is instantiated on the computing hardware 210, with a hypervisor executed in a first security ring, for example, Ring 0. In S340, the guest, for example guest 230-1, is instantiated on the respective VM 220, for example, VM 220-1, with its kernel (e.g., kernel 232-*i*) also executed in the first security ring, for example, Ring 0. In addition, the applications of the guest 230-1 are executed in a second security ring, for example, Ring 3. In S350, it is checked whether more requests are to be handled, and if so execution continues with S310; otherwise, execution terminates.

It should be understood that the execution of the kernel of the guest 230 and the respective hypervisor of the VM 220 in the same security ring provide the advantages described hereinabove, and provide superior performance and usage of computing resources. It should be further noted that the advantages discussed herein are of particular value in a nested virtualization environment as such environments would otherwise require significant overhead in their execution, which is prevented when using the embodiments discussed herein.

The various embodiments of the invention may be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus operating in a virtualized environment, comprising:
   a processor; and
   a memory coupled to the processor configured to store at least a first set of instructions for execution of at least one virtual machine by the processor, wherein each of the at least one virtual machine executes a single hypervisor that is being executed in a first security ring, the memory further stores a second set of instructions for execution of a single guest program by the processor over each of the at least one virtual machine, the guest program comprises a single kernel and at least one application executed therein,
   wherein the single kernel of the single guest program is executed in the first security ring with the single hypervisor and the at least one application of the single guest program is executed in a second security ring, wherein the first security ring is Ring 0,
   wherein an instruction issued by the at least one application of the single guest program is executed without trapping the single hypervisor, wherein the instruction requires intervention by the kernel of the single guest program and the single hypervisor, and wherein the single hypervisor runs the single guest program in the first security ring.

2. The apparatus of claim 1, wherein the second security is Ring 3.

3. The apparatus of claim 1, wherein execution of a first jump instruction that requires intervention by at least one of the kernel and the hypervisor results in replacement of the first jump instruction with a second jump instruction directly to a desired location in the memory, wherein the first jump instruction is a long jump instruction.

4. The apparatus of claim 3, wherein the hypervisor uses a hash table to determine the return address for the second jump instruction.

5. The apparatus of claim 3, wherein the memory further comprises a cache for storing the desired location.

6. The apparatus of claim 1, wherein the virtualized environment is a nested virtualized environment.

7. A method for efficient execution of a guest in a virtualized computing environment comprising:
   causing an execution of at least one virtual machine on a computing hardware, the virtual machine executes a single hypervisor in a first security ring;
   causing an execution of a single guest program on each of the at least one virtual machines, the single guest program comprises a single kernel being executed in the first security ring and at least one application being executed in a second security ring, wherein the first security ring is Ring 0; and
   causing an execution of an instruction issued by the at least one application of the single guest program without trapping the single hypervisor, wherein the instruction requires intervention by of the kernel of the single guest program and the single hypervisor, wherein the single hypervisor runs the single guest program in the first security ring.

8. The method of claim 7, further comprising:
   executing instead of a first jump instruction that requires intervention by at least one of the kernel and the hypervisor, a second jump instruction directly to a desired location, wherein the first jump instruction is a long jump instruction.

9. The method of claim 7, further comprising storing the desired location in a cache portion of a memory unit in the computing hardware.

10. The method of claim 7, wherein the second security ring is Ring 3.

11. The method of claim 7, wherein the virtualized computing environment is a nested virtualization computing environment.

12. The method of claim 7, wherein the computing hardware includes at least a processor coupled to a memory unit.

13. The method of claim 7, further comprising:
    instantiating the single guest program on one of the at least one virtual machine.

14. A tangible and non-transient computer readable storage medium containing thereon a plurality of instructions that when executed by a computer perform the method of claim 7.

* * * * *